US009712662B2

(12) United States Patent
Glezerman et al.

(10) Patent No.: US 9,712,662 B2
(45) Date of Patent: Jul. 18, 2017

(54) METHOD OF EXTENDING AN INTERCOM COMMUNICATION RANGE AND DEVICE THEREOF

(71) Applicant: CARDO SYSTEMS, INC., Pittsburgh, PA (US)

(72) Inventors: Abraham Glezerman, Tel Aviv (IL); Abraham Moato, Rishon Le'Zion (IL)

(73) Assignee: CARDO SYSTEMS, INC., Pittsburgh, PA (US)

( * ) Notice: Subject to any disclaimer, the term of this patent is extended or adjusted under 35 U.S.C. 154(b) by 0 days.

(21) Appl. No.: 15/032,028

(22) PCT Filed: Nov. 2, 2014

(86) PCT No.: PCT/IL2014/050943
§ 371 (c)(1),
(2) Date: Apr. 25, 2016

(87) PCT Pub. No.: WO2015/063771
PCT Pub. Date: May 7, 2015

(65) Prior Publication Data
US 2016/0294999 A1    Oct. 6, 2016

(30) Foreign Application Priority Data

Nov. 3, 2013 (IL) .......................... 229215
Jan. 6, 2014 (IL) .......................... 230346

(51) Int. Cl.
*H04M 1/725* (2006.01)
*H04L 29/14* (2006.01)
(Continued)

(52) U.S. Cl.
CPC .......... *H04M 1/7253* (2013.01); *H04L 69/40* (2013.01); *H04M 1/6033* (2013.01);
(Continued)

(58) Field of Classification Search
CPC ................................................... H04M 1/7253
See application file for complete search history.

(56) References Cited

U.S. PATENT DOCUMENTS 7,065,367 B2 * 6/2006 Michaelis ............. H04W 88/06
370/342
7,844,295 B1 * 11/2010 Ngan ................... H04M 1/7253
370/338

FOREIGN PATENT DOCUMENTS

WO    2013065039    5/2013

OTHER PUBLICATIONS

International Search Report (4 pages) and the Written Opinion (7 pages) issued Feb. 18, 2015 in PCT/IL2014/050943.

* cited by examiner

*Primary Examiner* — Tuan H Nguyen
(74) *Attorney, Agent, or Firm* — Rankin, Hill & Clark LLP

(57) ABSTRACT

The present invention relates to a method of extending an intercom communication range, comprising: a) during the pairing process between a first headset communication device and a second headset communication device, providing cellular related parameters, to be stored in a memory module of each headset communication device, in addition to the common Bluetooth required parameters, such that the cellular related parameters of the first headset includes a cellular phone number associated with the second headset and vice versa; b) establishing an intercom communication between both headsets via a Bluetooth channel; and c) upon detecting intercom communication loss at said Bluetooth channel or unavailable Bluetooth link during said intercom communication, temporarily routing the intercom communication to an alternate cellular communication channel by (Continued)

initiating a cellular call using the stored cellular phone number of the second headset.

16 Claims, 1 Drawing Sheet

(51) Int. Cl.
*H04W 76/02* (2009.01)
*H04M 1/60* (2006.01)
*H04W 4/00* (2009.01)
*H04W 88/06* (2009.01)
*H04W 84/18* (2009.01)
*H04L 29/06* (2006.01)

(52) U.S. Cl.
CPC ............ *H04W 4/001* (2013.01); *H04W 4/008* (2013.01); *H04W 76/023* (2013.01); *H04W 76/027* (2013.01); *H04L 69/18* (2013.01); *H04W 84/18* (2013.01); *H04W 88/06* (2013.01)

METHOD OF EXTENDING AN INTERCOM COMMUNICATION RANGE AND DEVICE THEREOF

CROSS-REFERENCE TO RELATED APPLICATIONS

The present invention is filed under 35 U.S.C. §371 as the U.S. national phase of International Application No. PCT/IL2014/050943, filed Nov. 2, 2014, which designated the U.S. and claims the benefit of priority to Israeli Patent Application No. 229215, filed Nov. 3, 2013, and to Israeli Patent Application No. 230346 filed Jan. 6, 2014, each of which is hereby incorporated in its entirety including all tables, figures and claims.

FIELD OF THE INVENTION

The present invention relates to the field of headset communication devices. More particularly, the invention relates to an intercom range extender for improving transmission services between headset devices.

BACKGROUND OF THE INVENTION

A group of physically proximate headset communication devices have the ability to communicate with each other in an intercom communication manner via Bluetooth channel. Bluetooth permits the grouping of physically proximate headsets (or other wireless devices) into local networks known as "piconets." Such piconets may operate in a "peer-to-peer" manner (each communicating directly with one another), or may utilize a "master-slave" relationship, in which one device serves as a central point for the network, through which each of the other network devices communicate.

However, such headset devices provide Bluetooth intercom communication for only a limited range. This means that the transmission range typically does not extend beyond approximately 10 meters for low power (class 3) Bluetooth devices, while high power (class 1) devices may produce up to 100 mW output, for an approximate transmission range of 100 meters. For cost and power consumption (battery life) considerations, most headset devices implementing Bluetooth are class 3 devices.

Some headset devices provide enhanced intercom Bluetooth communication capabilities, such as the Scala Rider G9 by Cardo Systems Inc., which is a motorcycle intercom Bluetooth communication system that offers bike-to-bike intercom communication up to a range of 1.5 km.

Given the portability of such a headset device, it may easily be moved beyond its effective transmission range useful for communicating with other headset devices. This can result in abrupt transmission interruptions (or stoppages) between the devices. Moreover, the communication range is degraded when there is no line of sight according to terrain.

Although the transmission range of the device could be extended by increasing its power (or by other common methods), such alterations would be problematic for reasons such as cost, battery limitations and increased interference between devices.

It is an object of the present invention to provide a system which is capable of extending the limited communication range of common headset devices without increasing the Bluetooth power scheme.

Other objects and advantages of the invention will become apparent as the description proceeds.

SUMMARY OF THE INVENTION

The present invention relates to a method of extending an intercom communication range, comprising the steps of:
During the pairing process between a first headset communication device and a second headset communication device, providing cellular related parameters, to be stored in a memory module of each headset communication device, in addition to the common Bluetooth required parameters, such that the cellular related parameters of the first headset includes a cellular phone number associated with the second headset and vice versa;
Establishing an intercom communication between both headsets via a Bluetooth channel; and
Upon detecting intercom communication loss at said Bluetooth channel or unavailable Bluetooth link during said intercom communication, temporarily routing the intercom communication to an alternate cellular communication channel by initiating a cellular call using the stored cellular phone number of the second headset.

According to an embodiment of the invention, the intercom communication can be temporarily routed to the alternate cellular communication channel until the Bluetooth channel becomes available again, and whenever said Bluetooth channel is available re-routing the intercom communication back to Bluetooth channel.

According to an embodiment of the invention, the stored cellular phone number in the first headset is associated with a cellular communication module included within the second headset.

According to an embodiment of the invention, the stored cellular phone number in the first headset is associated with a cellular mobile device associated with the second headset.

According to an embodiment of the invention, the first headset may act as a hands-free device to a cellular mobile device paired with said first headset. In such a case the first headset will initiate the cellular call for reestablishing the intercom communication using the cellular capabilities of the paired cellular mobile device via Bluetooth.

According to an embodiment of the invention, the first headset includes a cellular communication module, such that said first headset will initiate the cellular call for reestablishing the intercom communication using the cellular capabilities of the cellular communication module.

According to an embodiment of the present invention, the method further comprises generating an alert when the communication is changing medium from Bluetooth to cellular for allowing each user of the headset to choose whether to accept or deny the cellular call.

According to an embodiment of the present invention, the method further comprises allowing the second headset to automatically accept the cellular call, thus enabling seamless communication to continue.

According to an embodiment of the present invention, during the communication via the cellular channel the headset is used as wireless earphones equipment.

According to an embodiment of the present invention, the method further comprises storing the cellular phone number in the memory of the headset during the pairing process.

According to an embodiment of the present invention, the cellular phone number is attached to the pairing process and stored in the memory of the headset communication device via a coupling procedure that is performed via a web server, a web application, a mobile/smartphone/tablet application or a combination thereof.

According to an embodiment of the invention, further comprising enabling to store and manage in the memory module of the headset communication contacts list that may include a plurality of pre-defined telephone numbers, wherein said headset communication device enables to establish hands free call to any one of said pre-defined telephone numbers, while the communication is established via a cellular communication channel either via a built-in cellular communication module or via a cellular mobile device paired with the headset communication device.

In another aspect the invention relates to a headset communication device with intercom range extender capabilities, comprising a cellular module adapted to temporarily re-establishing an interrupted or low-grade intercom communication via a cellar channel upon detection of intercom communication loss via a Bluetooth channel. Optionally, the headset communication device may include a cellular communication module that acts as a hands free calling module for enabling a user to initiate hands free calls to another user via said headset communication device

DETAILED DESCRIPTION OF THE INVENTION

Figure 1:
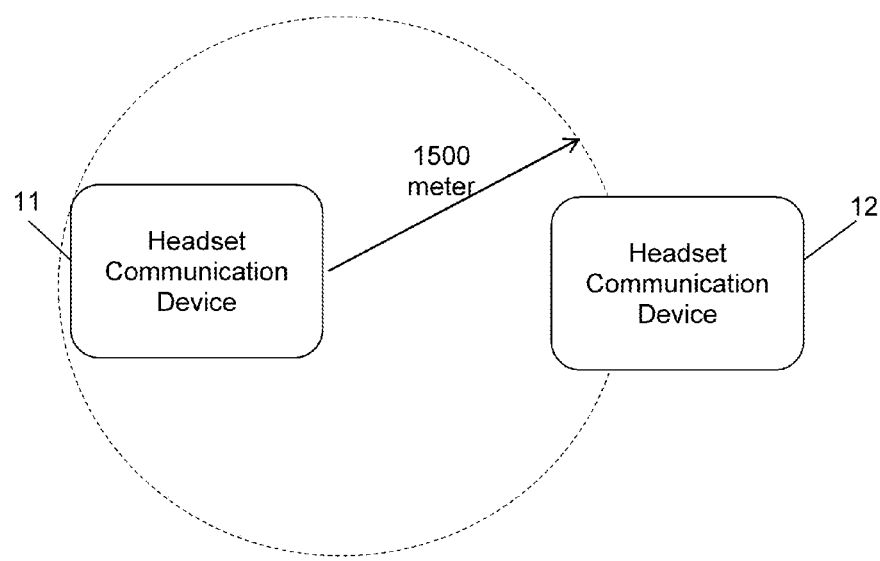
FIG. 1 schematically illustrates headset communication devices.

The present invention relates to a headset communication device with intercom range extender capabilities such that when a Bluetooth intercom communication is limited or broken (e.g., due to environmental conditions), the communication between riders (i.e., between two headset devices) will be re-established via a cellular communication channel. As nowadays, cellular communication is widespread and enables communication solution between distant users.

In the following detailed description references are made to the accompanying drawings that form a part hereof, and in which are shown by way of illustrations specific embodiments or examples. These embodiments may be combined, other embodiments may be utilized, and structural changes may be made without departing from the spirit or scope of the claimed invention. The following detailed description is therefore not to be taken in a limiting sense and the scope of the present invention is defined by the appended claims and their equivalents.

Referring now to the drawings, in which like numerals refer to like elements through the several figures, aspects of the present invention and an exemplary operating environment a headset communication device will be described.

FIG. 1 schematically illustrates headset communication devices 11 and 12.

For example, each of the devices 11 and 12 could be a type of Bluetooth device (such as the Scala Rider G9) having an effective transmission range of up to 1.5 Km (e.g., as indicated by the dotted circle with respect to device 11). Device 11 would not normally be capable of transmitting data to device 12 if device 12 is located at an effective transmission range greater than the effective transmission range. However, the present invention allows device 11 to continue to transmit to device 12 over an increased effective transmission range (i.e., a range that is much greater than the effective transmission range).

In general, headset communication devices need to perform pairing in order to enable Bluetooth intercom communication between two parties. In addition, each headset communication device is paired also to a cellular phone.

According to an embodiment of the invention, in order to enable intercom range extension between two headset communication devices (i.e., a first party and a second party), the headset pairing process includes cellular related parameters (e.g., a cellular phone number associated with the paired party) in addition to the common Bluetooth required parameters. For example, this can be performed via the proprietary pairing process of the headset device, such that when the headset communication device detects intercom communication loss, the initiator of the intercom call (i.e., the first party) will initiate cellular call to the second party. The second party may automatically accept the call, thus enabling seamless communication to continue. Optionally, the cellular phone number can be stored in the memory of the headset during the pairing process. Alternatively, the cellular phone number can be attached to the pairing process via a web server, a web application, a mobile/smartphone/tablet application or a combination thereof, e.g., as disclosed in the international PCT application published as WO 2013/065039.

In more details, when the intercom communication is lost, the headset allocates the cellular number of the second party (e.g., as saved next to Bluetooth Address during pairing) and uses the user's paired cellular phone to dial and call the second party. Optionally, the user will receive an alert (e.g., audible alert) when the communication is changing medium from Bluetooth to cellular (e.g., to enable the user to accept or deny the cellular call).

According to an embodiment of the invention, the headset communication device 11 comprises hands free calling module that enables the rider to perform hands free calls to his riding partners (e.g., to the headset communication device 12), using speech recognition technique. The hands free calling system allows the rider to call other riders without the use of hands (e.g., via voice commands). In this context, riding partners are riders that their headset communication device was paired in advanced to the user's headset communication device, as occur with headset communication devices 11 and 12. In a standard operating mode, the communication with the riding partners is established via Bluetooth intercom communication channel, which is free of charge.

According to an embodiment of the invention, the headset communication device with intercom range extender capabilities enables the rider to establish hands free call to any pre-defined telephone number, for example: calling home, office, partner, etc. The communication with the non-riding partners is done via a cellular communication channel (e.g., via a cellular mobile phone paired with the headset communication device).

A rider can build his contacts list that paired his headset communication device with his riding partners, via a web service (e.g., using the Cardo community web portal where the coupling procedure is performed via a web server, a web application, or a combination thereof as disclosed in the international PCT application published as WO 2013/065039) or using flash pairing procedure. Access to web service can be obtained via a tablet, a smartphone, a personal computer, or any other computer based system having network capabilities and that is able to implement client-server interaction. The contacts list contains other headset communication device information, including Bluetooth BD address and contact name, enabling saying a contact name (or other voice command) to initiate Bluetooth intercom call.

Alternatively, a rider that is using a web service, such as the Cardo community, can build contacts list to define also a non-rider contact in the Cardo community. The phone number and the non-rider contact name will be saved within the headset communication device. For example, when the user will say the non-rider name or other voice command, the headset communication device will recognize the name (e.g., via speech recognition circuitry of the hands free calling module) and will initiate cellular mobile phone call to that non-rider contact.

As mentioned, using such a web service provides the option to call a contact by cell phone via the headset communication device. In this case, the headset communication device is used as a wireless headset. What is unique is that the rider says the contact name, and accordingly the headset communication device identifies the name of the contact, thereby causing the rider's mobile phone to call (via the cellular channel) the contact's phone number (i.e., as stored in the memory of the headset during the contacts list creation via the web service). For example, each record of a contact in the contact list may include: name, phone number, a list of phonemes or other data relevant for speech recognition, compressed audio file (including contact name pronunciation mechanism in one or more languages), etc. In one embodiment, the rider required to provide a phone number, contact's name (with two words) and to set up the language. This is because the speech recognition and the text-to-speech process affected by the language.

To create an entry in the contact list, the rider connects the headset communication device to the Cardo community web service, which allows the rider to define a contact. After the rider enters the contact name and phone number (in text form), the process of creating the contact's record begins and may involve the following steps: converting the contact's name into an audio file (e.g., using text to speech engine) and compressing the audio file; converting the contact's name into speech recognition data form (e.g., phonemes list).

As a result, this enables storing a list of contacts in the memory of the headset communication device, wherein each name of stored contact can be associated with parameters of a headset communication device or with any telephone number. Accordingly, this enables to initiate a hands free call from the first headset communication device to each stored contact, either via the Bluetooth channel to other headset communication device or by establishing a cellular call to the associated telephone number.

Figure 2:
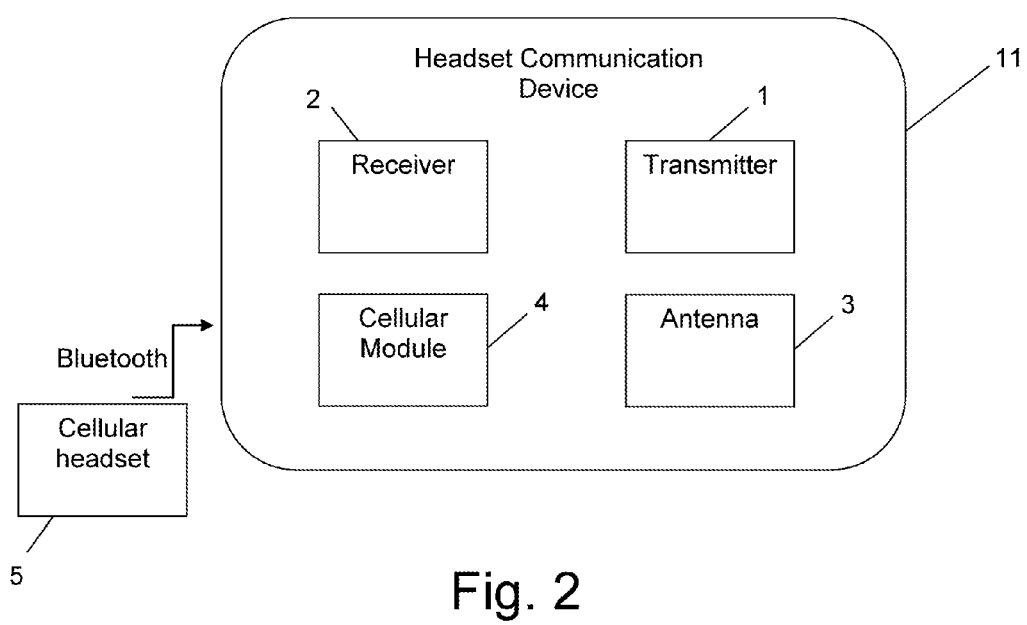
FIG. 2 schematically illustrates a block diagram of a headset communications device, according to an embodiment of the present invention.

FIG. 2 schematically illustrates a block diagram of the headset communication device 11, according to an embodiment of the invention. In FIG. 2, device 11 includes a transmitter 1 and receiver 2, which transmit and receive data via antenna 3. Operating in conjunction with transmitter 1 and receiver 2 is a cellular module 4, which is operable to temporarily route the intercom communication data to an alternate cellular communication channel, such that the effective transmission range (e.g., 1.5 Km) is effectively increased to a much greater transmission range. According to one embodiment, the cellular module 4 initiates the process of communication for reestablishing the intercom communication through the rider's cellular phone 5 that is paired with the headset communication device by transferring the stored cellular phone number to the cellular phone via the Bluetooth channel. In other embodiment, headset communication device 11 includes a cellular communication module (e.g., can be embedded as part of cellular module 4), such that device 11 will initiate the cellular call for reestablishing the intercom communication using the cellular capabilities of the cellular communication module. This eliminates the need to use the rider's cellular phone 5.

According to an embodiment of the present invention, the intercom range extender may operate as follows: Device 11, which desires to transmit, first attempts to communicate in the normal manner; i.e., transmitter 1 sends out a burst (Bluetooth typically utilizes an access code at the start of each message burst). If receiver 2 of devicell is able to hear a recipient device, but the other device (i.e., the second party) does not respond (or if receiver 2 receives nothing in response), cellular module 4 then tries re-establishing the communication via a cellular communication channel (instead of the Bluetooth channel), by dialing the cellular number of the receiving device (i.e., the second party) as was previously saved during the pairing process.

On the receiving side, when a device equipped with this invention receives an incoming call, it re-establishes the unsuccessful intercom communication via the cellular channel instead of the Bluetooth channel.

According to an embodiment of the invention, during the communication via the cellular channel the headset can be utilized as wireless earphones equipment.

Unless otherwise indicated, the functions described herein may be performed by executable code and instructions stored in computer readable medium and running on headset communication devices.

As will be appreciated by the skilled person the arrangement described in the figures results in an intercom range extender, thus when a Bluetooth intercom communication is broken (e.g., due to environmental conditions), the communication between riders will be re-established via a cellular communication channel.

All the above description and examples have been given for the purpose of illustration and are not intended to limit the invention in any way. While certain references are made to certain example system components or services, other components and services can be used as well and/or the example components can be combined into fewer components and/or divided into further components. Many different mechanisms, methods of analysis, electronic and logical elements can be employed, all without exceeding the scope of the claimed invention.

The invention claimed is:

1. A method of extending an intercom communication range, comprising the steps of:
   a. during the pairing process between a first headset communication device and a second headset communication device, providing cellular related parameters, to be stored in a memory module of each headset communication device, in addition to common wireless parameters, such that the cellular related parameters of the first headset include a cellular phone number associated with said second headset and vice versa;
   b. establishing an intercom communication between both headsets via a wireless channel; and
   c. upon detecting intercom communication loss at said wireless channel or unavailable wireless link during said intercom communication, temporarily routing the intercom communication to an alternate cellular communication channel by initiating a cellular call between said first and second headsets using the stored cellular phone number of the second headset using the alternate cellular communication channel.

2. A method according to claim 1, further comprising generating an alert when the communication is changing medium from wireless to cellular for allowing each user of the headset to choose whether to accept or deny the cellular call.

3. A method according to claim 1, further comprising allowing the second headset to automatically accept the cellular call, thus enabling seamless communication to continue.

4. A method according to claim 1, wherein during the communication via the cellular channel, the headset is used as wireless earphone equipment.

5. A method according to claim 1, further comprising storing the cellular phone number in the memory of the headset during the pairing process.

6. A method according to claim 1, wherein the cellular phone number is attached to the pairing process and stored in the memory of the headset communication device via a coupling procedure that is performed via a web server, a web application, a mobile/smartphone/tablet application, or a combination thereof.

7. A method according to claim 6, further comprising enabling storing a list of contacts in the memory of the headset communication device, wherein each name of a stored contact can be associated with parameters of a headset communication device or with a telephone number.

8. A method according to claim 7, further comprising enabling to initiate a hands free call from the first headset communication device to each stored contact, either via the wireless channel to the other headset communication device or by establishing a cellular call to the associated telephone number.

9. A method according to claim 1, further comprising enabling to initiate a hands free call from the first headset communication device to the second headset communication device.

10. A method according to claim 1, wherein the stored cellular phone number in the first headset is associated with a cellular communication module included within the second headset.

11. A method according to claim 1, wherein the stored cellular phone number in the first headset is associated with a cellular mobile device associated with the second headset.

12. A method according to claim 1, wherein the first headset acts as a hands-free device to a cellular mobile device paired with said first headset, such that the first headset will initiate the cellular call for reestablishing the intercom communication using the cellular capabilities of the paired cellular mobile device via the wireless channel.

13. A method according to claim 1, wherein the first headset includes a cellular communication module, such that said first headset will initiate the cellular call for reestablishing the intercom communication using the cellular capabilities of the cellular communication module.

14. A method according to claim 1, wherein the intercom communication is temporarily routed the to the alternate cellular communication channel until the wireless channel is available again.

15. A method according to claim 1, further comprising enabling to store and manage, in the memory module of the headset communication device, a contacts list that includes a plurality of pre-defined telephone numbers, wherein said headset communication device enables to establish a hands free call to any one of said pre-defined telephone numbers, by establishing a communication via a cellular communication channel either via a built-in cellular communication module or via a cellular mobile device paired with the headset communication device.

16. A headset communication device with intercom range extender capabilities, comprising a cellular module adapted to temporarily re-establish an interrupted or low-grade intercom communication via a cellular communication channel, and a cellular communication module that acts as a hands free calling module for enabling a user to initiate hands free cellular calls to another user via said headset communication device upon detection of intercom communication loss via a wireless channel.

\* \* \* \* \*